United States Patent Office 3,439,899
Patented Apr. 22, 1969

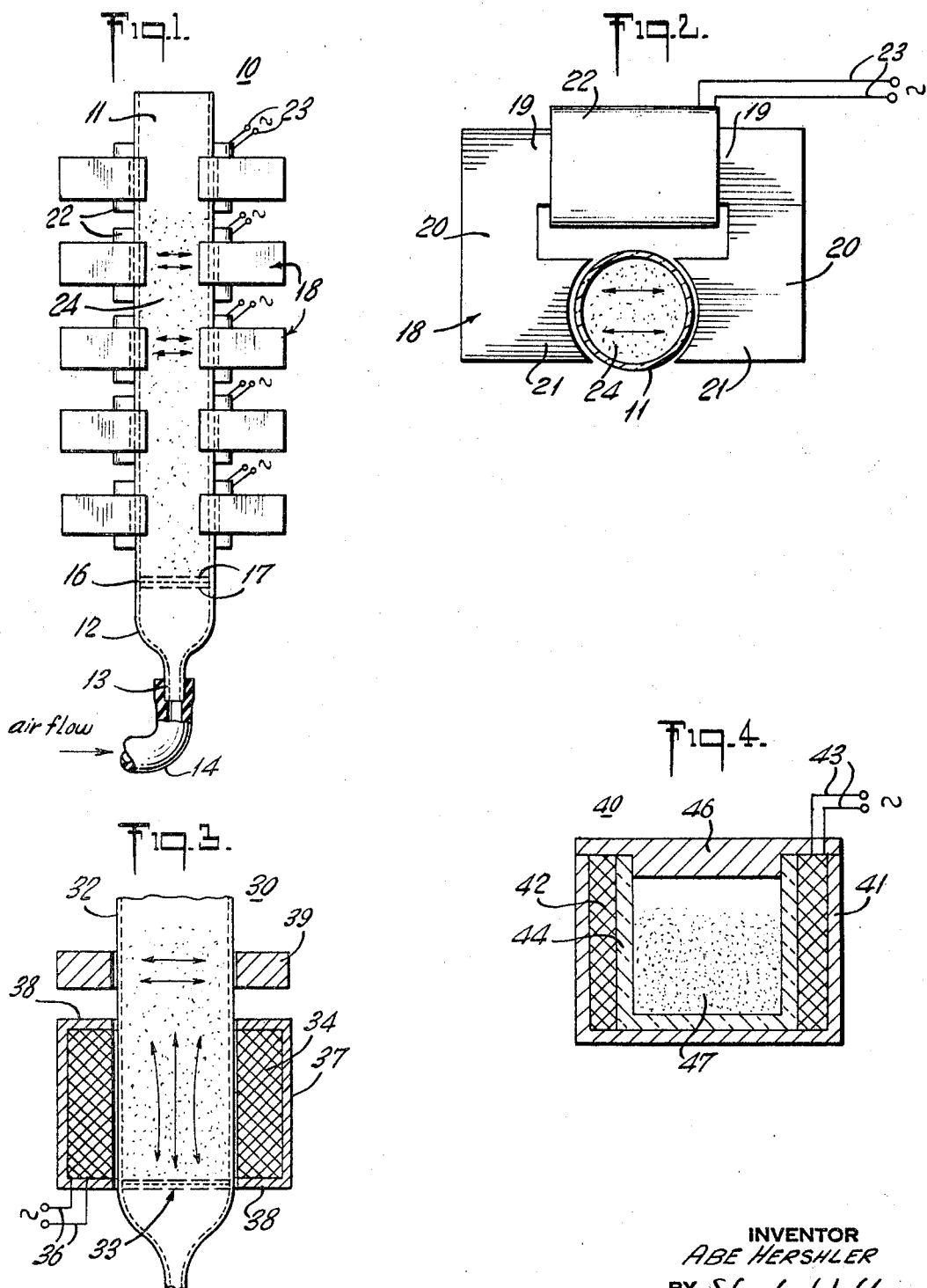

3,439,899
**METHOD FOR THE PRODUCTION AND
CONTROL OF FLUIDIZED BEDS**
Abe Hershler, Flushing, N.Y., assignor to Magneto Dynamics, Inc., Bronx, N.Y., a corporation of New York
Filed Feb. 27, 1967, Ser. No. 618,908
Int. Cl. B01f *3/18, 11/00, 17/00*
U.S. Cl. 259—1                                                    17 Claims

ABSTRACT OF THE DISCLOSURE

A particulate material having distributed therethrough small permanent magnets whose average individual size is preferably between 2 and 10 times that of the non-magnet particles is subjected to an upward flow of gas and to a magnetic field varying with time direction and intensity to produce and control the resulting fluidized bed. The varying magnetic field may be concentrated in localized regions of the bed and surface control is achieved by providing a horizontal varying magnetic field at the surface of the bed. Fluidization may be achieved without the gas flow and also without any non-magnet particles.

---

A fluidized bed briefly consists of a mass of a particulate solid material in which the individual particles are in continuous motion relative to each other whereby the mass or fluidized bed possesses the characteristics of a liquid. Like a liquid it will flow or pour freely, there is a hydrostatic head pressure, it seeks a constant level, it will permit the immersion of objects and will support relatively buoyant objects, and in many other properties it acts like a liquid. A fluidized bed is conventionally produced by effecting a flow of a gas through a porous or perforate plate or membrane underlying the particulate mass, at a sufficient rate to support the individual particles in a relatively continuously moving manner. A minimum air flow or pressure drop is required to produce fluidization and is known as the incipient fluidization and is dependent on many parameters including particle size, particle density, etc. Any increase in the gas flow beyond incipient fluidization causes an expansion of the fluidized bed to accommodate the increased gas flow until the gas velocity exceeds the free falling velocity of the particles which are then carried out of the apparatus.

Fluidized beds possess many applications, for example in temperature control, heat transfer, catalyst reactions, and various chemical and physical reactions such as oxidation, reduction, drying, polymerization, coating, diffusion, filtering and the like. However, the establishment and maintenance of a stable fluidized bed by conventional procedures is a sensitive and difficult process possessing many drawbacks and disadvantages.

Among the problems associated with fluidized beds, a most basic one is that of bubble formation, frequently resulting in slugging, channeling, spouting and pneumatic transport; this problem is most common in gas-fluidized systems. The problem necessitates critical flow control and effects design factors such as minimum fluidization velocities, pressure drops, particle sizes, etc. Bubbling causes both chemical and mechanical difficulties; for example, in gas-solids reactions gas bubbles may bypass the particles altogether resulting in lowered contact efficiency. Bubbles create mechanical buffeting sufficient to cause breakage of weak fibers, fabric or paper when dried in hot fluidized beds.

Ideally, a fluidized bed should be free of bubbles, homogeneous, maintain particle circulation, and manifest non-critical flow velocity control for various bed heights and thru a wide range of bed densities. Many procedures and systems have been proposed to effect improvements, for example by the use of baffles, gas distribution perforated plates, mechanical vibration and mixing devices, the use of mixed particle sizes, gas plus liquid flow schemes, special flow control valves, etc.; but these are far from satisfactory and leave much to be desired.

It is therefore a principal object of the present invention to provide an improved method for the handling and treatment of a solid particulate material.

Another object of the present invention is to provide an improved method for the production and maintenance of a fluidized bed.

Still another object of the present invention is to provide an improved method for producing and maintaining a fluidized bed which is stable, free of bubbles, slugs, channeling, spouting or the like.

An additional object of the present invention is to provide an improved method for the surface control of fluidized beds.

A further object of the present invention is to provide an improved method for the production and maintenance of a fluidized bed in the absence of any fluid flow for effecting such fluidization.

Still a further object of the present invention is to provide an improved method for enhancing the fluid flow process of producing and maintaining a fluidized bed.

Another object of the present invention is to provide an improved method of the above nature characterized by its reliability, adaptability, versatility and simplicity.

The above and other objects of the present invention will become apparent from a reading of the following description, taken in conjunction with the accompanying drawings, wherein:

FIGURE 1 is a front elevational view of an apparatus which may be employed to advantage in practicing the present method;

FIGURE 2 is a top plan view thereof;

FIGURE 3 is a vertical sectional view of another form of apparatus which may be employed; and FIGURE 4 is a view similar to FIGURE 3 of still another form of apparatus.

In a sense the present invention contemplates the provision of the method of producing a fluidized bed comprising subjecting a mass normally in a non-fluidized condition and containing a particulate solid material including a plurality of separate discrete magnet particles having a coercive force exceeding 50 oersteds to a magnetic field varying with time in direction and intensity to impart individual motions to said magnet particles whereby to fluidize said particulate solid material.

Advantageously the magnet elements are permanent magnets of non-spherical and non-cylindrical, preferably arbitrary shapes having an average particle size preferably between 2 and 10 times the average particle size of the non-magnet particulate solid material to be fluidized and preferably of diameters between .006 and 1.0 inch. Furthermore, although the entire bed may be formed of magnet elements, the total volume of the magnet elements is advantageously between 10% and 20% of the volume of the non-magnetic particulate material and between 2% and 10% of the active volume of the varying magnetic field, that is the volume of the varying magnetic field wherein the magnet elements are dispersed. The varying magnetic field advantageously reaches an intensity of at least 20 oersteds. While the magnetic field advantageously varies sinusoidally at a frequency of 50 or 60 cycles per second since such varying magnetic fields are easily established by the use of available commercial AC power lines, the magnetic field may vary with time in direction and intensity in other manners and at frequencies between 0.5 and 100,000 cycles per second or more, as described in U.S. Patent No. 3,219,318 granted Nov. 23, 1965 to A. Hershler. Moreover, while fluidization of a particulate material may be effected in the substantial absence of an upward flow of fluid, it has been found that the use of an upward flow of fluid, advantageously a gaseous fluid, together with the magnet elements and the varying magnetic field permits the production of fluidized beds in a manner which overcomes the many drawbacks encountered by the use of the fluid flow alone. Among the advantages achieved by the use of the magnet elements and varying magnetic field in augmenting the fluid flow are the elimination or minimization of bubbling, channeling and slugging, the lowering of the minimum required fluid flow rate, the reduction in the criticality of fluid flow control for optimum fluidized bed height, a radical improvement in the fluid bed homogeniety, heat transfer and blending, the wide and simple control of bed heights and the very effective control of the bed surface.

The permanent magnet elements or particles are preferably dippled, ridged or otherwise shaped to prevent intimate surface contact between the particles and may be uncoated or suitably coated with an organic polymeric material, rubber, glass, silicone, inert metal plating, or the like or may be encased in any desirable material including metals and ceramics. The minimum size of the permanent magnet element is that of a single magnetic domain (0.01 to several microns in diameter) and the maximum size is between 0.5 and 5.0 centimeters in diameter. The coercive force of the magnet elements is advantageously as high as possible and should advantageously exceed 50 oersteds, Alnico 8 or barium ferrite (oriented and non-oriented) being highly satisfactory magnet materials. The permanent magnet elements may be produced in any known manner, in powdered or crushed form or cast or pressed to size and shape.

The following examples are given merely by way of illustration and are not intended to limit the scope of the present invention.

Referring now to the drawing, and particularly FIGURES 1 and 2 thereof which illustrate an apparatus which may be advantageously employed in practicing the present invention, the reference numeral 10 generally designates the apparatus which includes an open topped vertical cylindrical receptacle 11 formed of a non-magnetic material or one of low magnetic permeability such as glass, ceramic, plastic, non-magnetic metal or the like. The bottom 12 of the receptacle 11 is funneled to a vertical inlet pipe 13 which is connected by a tube 14 to a source of compressed air. A horizontal porous plate 16 in the form of a fine mesh screen extends transversely across the lower part of the receptacle 11 and is sandwiched between and supported by a pair of coarse screens 17.

A plurality of regularly vertically spaced similarly shaped magnet yokes 18 preferably formed of laminated soft iron are positioned along the height of the receptacle 11. Each yoke 18 is substantially U-shaped including a rear cross piece 19, and forwardly projecting side arms 20 terminating in inwardly directed opposite legs 21 provided with confronting cylindrical faces mating and substantially embracing the outer wall of the receptacle 11. A solenoid or coil 22 is wound about each of the yoke cross pieces 19 and is connected by leads 23 to a source of alternating current. Magnet particles, or a mixture 24 of magnet and non-magnet particles satisfying the parameters above set forth are positioned in the receptacle 11 and may be fluidized by introducing air of at least the fluidization incipient velocity through the resulting fluidized bed or in accordance with the present invention, fluidization may be effected by sufficiently energizing one or more of the solenoids 22 or by concurrently energizing one or more of the solenoids 22 and flowing air by way of the tube 14 upwardly through the receptacle 11.

In accordance with a specific example of the operation of the apparatus 10, the receptacle 11 is a 1 inch diameter glass tube 10 inches in length. Five ½ inch thick yokes 18 are provided with a 1 inch vertical spacing between yokes and each of the solenoids 22 consists of 500 turns of No. 26 copper wire. The porous plate 16 is a 200 mesh stainless steel screen and the screens 17 are 16 mesh. The receptacle 11 contained a mixture 24 of 45 milliliters of 20–30 mesh clean Ottawa sand and 5 milliliters of rubber coated anisotropic barium ferrite permanent magnet particles, approximately $\frac{1}{32}$ cubic inch each in dimension and of a coercive force of about 1200 oersteds.

Air was introduced into the pipe 14 at a pressure of about 1 to 4 pounds per square inch and, in the absence of energization of the solenoids 22, the incipient fluidization velocity of the air through the mixture 24 was about 0.9 feet per second. Upon energization of the solenoids 22 at 60 cycles per second at a current of about 0.25 ampere per solenoid, to produce a varying magnetic field of about 125 ampere turns per solenoid or about 70 oersteds per solenoid, the incipient fluidization air velocity fell to about 0.5 feet per second.

The slugging air velocity in the absence of the varying magnetic field was about 1.4 feet per second. At this air velocity slugging was eliminated by energizing the lower three solenoids 22 to produce a varying magnetic field at each yoke level of about 300 ampere turns or 150 oersteds with a power consumption of about 10 watts per solenoid. At an air velocity of about 3 feet per second through the receptacle, slugging and spouting were eliminated by energizing the lower three solenoids 22 to produce a varying magnetic field at each yoke level of about 500 ampere turns or 250 oersteds with an individual solenoid power consumption of about 20 watts.

In the absence of the varying magnetic field, at incipient fluidization, a ⅜ inch or 6% increase in bed height was achieved. In the presence of the above varying magnetic field of 70 oersteds per solenoid at incipient fluidization, a ⅝ inch or 8% increase in bed height occurred. It should be noted that increasing the ratio of the number of magnet to non-magnet particles results in increased control of the fluidized bed and as the number of non-magnet particles approaches zero the fluid or gas velocity has very little effect on the fluidized bed.

The fluidized bed produced in the manner described above with the use of the varying magnetic field may be employed for any of the application of conventional fluid beds with greater ease and versatility. The bed density may be easily varied and adjusted and the configuration and homogeniety of the bed may be controlled in many ways, for example by the use of magnetic shims and magnetic focusing devices for the varying magnetic field. Moreover, the fluidized bed particulate material may be magnetically confined since it has been found that the particulate material is substantially restrained against movement across the varying magnetic field lines in the presence of the magnet elements. Extremely effective bed surface control is one of the important advantages. By energizing only the solenoid at the bed surface, surface control may even be critically controlled and maintained despite internal bed slugging at very high upward fluid velocities.

While in the arrangement described above, the varying magnetic field is substantially horizontal it may be radial, inclined or vertical or assume any desired direction or combination of directions. Thus, in the apparatus illustrated in FIGURE 3 a combination of horizontal and vertical varying magnetic fields is employed. Specifically the apparatus 30 includes a receptacle 32 similar to the receptacle 11 described above and provided with a reinforced porous plate assembly 33 along its bottom and connected at its bottom to a source of compressed air. The lower section of the receptacle 32 is surrounded and engaged by a vertical coaxial solenoid or coil 34 which is connected by leads 36 to a source of alternating current whereby to produce a time varying vertical magnetic field in the lower part of the receptacle 32. The solenoid 34 is enclosed in a cylindrical soft iron yoke 37 having annular end walls 38 extending to the wall of the receptacle 32.

Positioned above the solenoid 34 are one or more vertically spaced yokes 39 similar to the yokes 18 and provided with solenoids which are connected to alternating current sources to produce time varying horizontal magnetic fields. The apparatus 30 is employed and operates in the manner of the apparatus 10 and is provided with an additional degree of control by reason of the vertical varying magnetic field. As in the earlier described apparatus, the currents to the various solenoids may be individually controlled as may the air flow through the receptacle 32. It should be noted that the horizontal and vertical varying magnetic fields may be distributed in manners other than those illustrated. Moreover, different motions may be imparted to the magnetic field. For example, a rotating magnetic field may be employed by providing two pairs of horizontal opposite yoke legs arranged in quadrature about the receptacle and energized by alternating currents having a 90° phase difference.

In FIGURE 4 of the drawing there is illustrated an apparatus 40 in which a fluidized bed may be produced in a closed space in the absence of any upward fluid flow. The apparatus 40 includes an open topped cylindrical cup shaped housing or shell 41 formed of a soft iron. Nested in the housing 41 and coaxial therewith and extending for the full length thereof is a solenoid 42 which is connected by leads 43 to an adjustable source of alternating current, for example at 60 cycles per second. A glass, ceramic or other non-magnetic material cylindrical open topped receptacle 44 nests in the solenoid 42. A suitable shaped lid 46 preferably of soft iron may be provided for closing the receptacle 44 and bridging the upper part of the yoke 41. A solid particulate material 47 which is to be fluidized is located in the receptacle 44 and may be formed solely of magnet elements or particles of the properties set forth above or a mixture thereof with non-magnet particles. In the absence of any upward fluid flow it has been found that the magnet elements should advantageously occupy at least 60% of the total volume of the particulate material.

As an example of the use of the apparatus 40 in accordance with the present invention the receptacle 41 was of glass, 4¼ inches in diameter and 5½ inches high, the solenoid 42 was 1000 turns of #17 copper wire, and the housing 41 and lid 46 were ½ inch thick laminated silicon steel. The particulate material 47 consisted of 200 millimeters of 1/64 inch cube shaped barium ferrite permanent magnet particles.

When the apparatus 40 operated without the lid 46 and with the solenoid 42 unenergized the height of the particulate material 47 was about 1 inch. Upon energization of the solenoid at a power of 10 watts with a 220 volt, 60 cycle per second alternating current, the height of the material or bed 47 was about 1¼ inch and in a churning motion. At a solenoid power consumption of 30 watts the fluidized bed 43 increased to a height of about 2 inches and was in thorough agitation, and upon increase of the solenoid power to 100 watts the bed of material 47 rose to 5 inches and resembled an advanced fluidized bed. With the solenoid power at 150 watts particle carryover occurred.

A constant temperature bath of 240° F. possessing excellent properties was produced by immersing a temperature controlled quartz heater into the bed and adjusting the solenoid power in the apparatus 40 to produce a fluidized bed of about 2½ inch height. The outside of the receptacle 44 was asbestos covered. The temperature response time of the fluidized bed was extremely rapid with precise and excellent temperature control. It should be noted that non-magnet particles may be admixed with the magnet particles, but in the absence of any upward fluid flow these preferably should not exceed 40% of the total bed volume.

While there have been described preferred embodiments of the present invention it is apparent that numerous alterations, additions and omissions may be made without departing from the spirit thereof. For example, while the fluidized bed has been illustrated in an overall stationary state it may be advanced or moved in any desired direction as by flowing through a chamber, pipe or the like. Moreover, it should be noted that there are many conditions and parameters which contribute to the fluidization step, such as particle size both of the magnets and the nonmagnet particles, relative sizes and quantities of these, gas flow, if any, frequency, configuration, shape and orientation of the varying magnetic field so that any precise dimensions of a suitable or optimum varying magnetic field is not possible. However, the optimum density of the varying magnetic field for a desired fluidized bed may be rapidly and easily determined for any set of ambient conditions by one skilled in the art in view of the above.

What is claimed is:

1. The method of producing a fluidized bed comprising passing a fluid upwardly through a normally non-fluidized mass containing a particulate solid material including a plurality of separate discrete magnet particles having a coercive force exceeding 50 oersteds to impart an upward force to the solid particles in said mass and subjecting said mass to a magnetic field varying with time in direction and intensity to impart individual motions to said magnet particles whereby to fluidize said particulate solid material.

2. The method of claim 1 wherein said fluid is gaseous.

3. The method of claim 1 wherein said varying magnetic field reaches an intensity exceeding 20 oersteds.

4. The method of claim 1 wherein said magnet particles have a particle size between .006 and 1.0 inch.

5. The method of claim 1 wherein said particulate solid material contains non-magnet particles and said magnet elements are permanent magnets and said fluid is gaseous.

6. The method of claim 5 wherein said magnet particles have a particle size between .006 and 1.0 inch and constitute between 10% and 20% of the volume of said non-magnet particles.

7. The method of claim 5 wherein the volume of said magnet particles is between 2% and 10% of the active volume of said varying magnetic field.

8. The method of claim 1 wherein said magnet elements are permanent magnets.

9. The method of claim 1 wherein said varying magnetic field varies sinusoidally with time.

10. The method of claim 1 wherein said varying magnetic field has a horizontal component through said particulate material.

11. The method of claim 10 wherein said horizontally oriented varying magnetic field is restricted to the surface region of said particulate material.

12. The method of claim 1 including controlling the temperature of said particulate material while subject to said varying magnetic field.

13. The method of claim 1 wherein said varying magnetic field has a vertical component through said particulate material.

14. The method of claim 1 wherein said magnetic field is concentrated in a predetermined region of said fluidized bed.

15. The method of claim 1 wherein said particulate solid material consists substantially solely of separate discrete magnetic particles.

16. The method of effecting the motions of solid particles in a fluidized bed of said particles in a gaseous ambient environment comprising subjecting a plurality of separate discrete magnet particles having a coercive force exceeding 50 oersteds and distributed throughout a region of said fluidized bed to a magnetic field varying in direction and intensity with time.

17. The method of producing a fluidized bed comprising subjecting a normally non-fluidized mass containing a particulate solid material in a gaseous ambient environment including a plurality of separate discrete magnet particles having a coercive force exceeding 50 oersteds to a magnetic field varying with time in direction and intensity to impart individual motions to said magnet particles whereby to fluidize said particulate solid material.

References Cited
UNITED STATES PATENTS

| | | | |
|---|---|---|---|
| 2,852,586 | 9/1958 | Steele | 259—99 X |
| 3,219,318 | 11/1965 | Hershler | 259—1 |
| 3,246,373 | 4/1966 | Lyman | 259—99 X |
| 3,314,670 | 4/1967 | Kennedy | 259—1 |

ROBERT W. JENKINS, *Primary Examiner.*